United States Patent [19]

Enari

[11] Patent Number: 5,369,441
[45] Date of Patent: Nov. 29, 1994

[54] REPRODUCING APPARATUS WITH SIMULTANEOUS PARALLEL PROCESSING OF DIFFERENT IMAGE SIGNALS

[75] Inventor: Masahiko Enari, Yokohama, Japan

[73] Assignee: Canon Kabushiki Kaisha, Tokyo, Japan

[21] Appl. No.: 87,113

[22] Filed: Jul. 1, 1993

Related U.S. Application Data

[63] Continuation of Ser. No. 548,833, Jul. 6, 1990.

[30] Foreign Application Priority Data

Jul. 6, 1989 [JP] Japan .................. 1-174966

[51] Int. Cl.⁵ .............. H04N 1/21; H04N 1/23; H04N 5/222
[52] U.S. Cl. .................. 348/559; 348/706; 348/24; 348/722; 348/571; 358/335; 358/444
[58] Field of Search ........... 358/105, 909, 335, 311, 358/320, 181, 183, 108, 22, 180, 310, 76, 78, 22 C, 22 CK, 22 PIP, 185, 444, 21 R, 404, 452, 142, 147, 160, 312; 360/14.1; 348/718, 715, 714, 719, 720, 721, 722, 571, 18, 22, 23, 24, 61, 385, 386, 460, 465, 473, 474, 553, 554, 559, 560, 564, 565–567, 578, 584, 586–589, 699, 705, 706, 708, 739, 844, 905, 524, 527, 530, 476, 909.1; H04N 1/21, 1/23, 5/222

[56] References Cited

U.S. PATENT DOCUMENTS

| | | | |
|---|---|---|---|
| 4,467,356 | 8/1984 | McCoy | 358/146 |
| 4,641,188 | 2/1987 | Dischert | 358/140 |
| 4,665,433 | 5/1987 | Hinson et al. | 358/22 |
| 4,712,133 | 12/1987 | Kikuchi | 358/98 |
| 4,746,979 | 5/1988 | Kashigi | 358/134 |
| 4,768,095 | 8/1988 | Wada et al. | 358/183 |
| 4,929,971 | 5/1990 | Imura et al. | 354/75 |
| 4,930,014 | 5/1990 | Maeda et al. | 358/209 |
| 4,982,279 | 1/1991 | Ishii et al. | 358/160 |
| 5,109,281 | 4/1992 | Kobori et al. | 358/444 X |
| 5,220,425 | 6/1993 | Enari et al. | 358/160 |

FOREIGN PATENT DOCUMENTS

| | | | |
|---|---|---|---|
| 59-027689 | 1/1984 | Japan | 358/181 |
| 2098021 | 11/1982 | United Kingdom | 358/141 |

Primary Examiner—Mark R. Powell
Assistant Examiner—Safet Metjahic
Attorney, Agent, or Firm—Fitzpatrick, Cella, Harper & Scinto

[57] ABSTRACT

A reproducing apparatus with simultaneous parallel processing of different image signals includes a storage device for storing a plurality of image signals supplied sequentially, each of the stored image signals representing a different image. A first structure is provided for reading out image signals stored in the storage device and supplying the read out image signals sequentially to an output terminal. A second structure is provided for separately storing outputting one image signal from among the plurality of stored image signals while image signals are being supplied sequentially from the first structure to the output terminal.

22 Claims, 4 Drawing Sheets

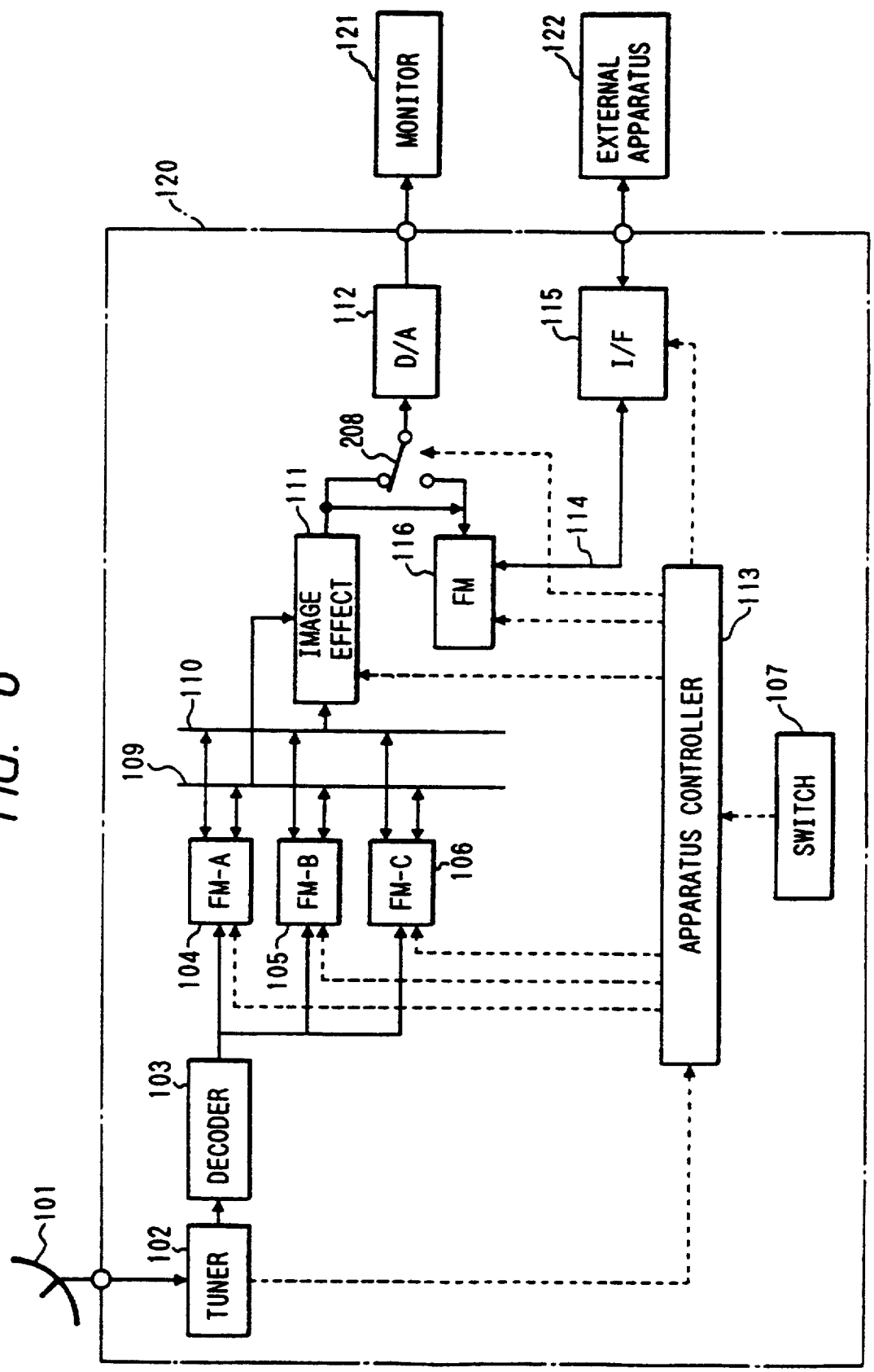

REPRODUCING APPARATUS WITH SIMULTANEOUS PARALLEL PROCESSING OF DIFFERENT IMAGE SIGNALS

This is a continuation of application Ser. No. 07/548,883 filed Jul. 6, 1990.

BACKGROUND OF THE INVENTION

1. Field of the Invention

This invention relates to a reproducing apparatus and, more particularly, to an apparatus for duplicatingly reproducing still images, for instance.

2. Related Background Art

It has been a practice to let a video signal supplied to an apparatus be tentatively stored in a memory and to let a signal read out from the memory be output to a monitor or to a printer.

Heretofore, however, where a memory used for a monitor or printer is also used for other purposes or where separate memories are provided, the contents of such two memories are altered continuously. Therefore, there is a problem in case of printing out data using a printer that an image signal supplied to the apparatus during printing is wasted.

In a different aspect, recently proposed broadcast television systems intended for practical use, aside from the conventional NTSC system with an aspect ratio of 3:4 and a scanning line number of 525, include those of finer resolution, for instance a HDTV system with an aspect ratio of 9:16 and a scanning line number of 1,125. The HDTV system can deal with about five times the image data quantity compared to the NTSC system and also uses a wide screen. Thus, it permits enjoyment of images which are dense and rich in the on-the-spot senser.

However, data quantity has been increased to such an extent that it can not be directly transmitted to each home due to limitations imposed on the broadcast waves and communication capacity. Therefore, bandwidth compression is adopted for transmission on the basis of commonly termed distribution quality, which is slightly inferior to the intrinsic image quality obtained in the studio. Table 1 shows specifications concerning the in studio quality and distribution quality in the HDTV system.

TABLE 1

|  | In-studio quality | Distribution quality |
|---|---|---|
| Scanning line number | 1,125 | 1,125 |
| Brightness bandwidth (Y) | 30 MHz | 20 MHz |
| Brightness sampling frequency | 74.25 MHz | 48.6 MHz |
| Chromatic difference bandwidth (Pr, Pb) | 15 MHz | 7 MHz |
| Chromatic difference sampling frequency | 37.125 MHz | 16.2 MHz |

It is thus inevitable to provide distribution quality for home enjoyment of HDTV system images as moving images.

In the meantime, with the HDTV system the scanning line number is large, and the image is dense and less subject to flickering. For this reason, the HDTV system image is enjoyable as a still image rather than as moving images, and utilization of the HDTV system in the fields of art, culture, education and animation has been expected. In the case of a still image, the observer looks at one frame of an image thoroughly in several to several tens of seconds. For this reason, in-studio quality is required as image quality.

Accordingly, a HDTV still image reproduction apparatus permitting enjoyment of in-studio quality is proposed separately from the HDTV distribution quality image reproduction apparatus. FIG. 4 shows a block diagram of an example of such a structure. Reference numeral 10 designates an antenna for receiving signals transmitted from a broadcast satellite, 12 is a HDTV still image reproduction apparatus, 14 is a HDTV color image monitor for displaying images with 1,125 scanning lines. In this still image reproduction apparatus, reference numeral 16 designates a tuner for converting signals received by antenna 10 into still image digital compression data, 18 is a decoder for decoding still image digital compression data obtained by, for instance, bandwidth compression in a DPCM process, into original image data, 20 and 22 are image frame memories each for storing one frame of decoded image data from decoder 18, 24 is a switch for selecting image frame memory 20 or 22 for writing decoded data from decoder 18, 26 is a switch for selecting image frame memory 20 or 22 for reading out stored data, and 28 is a D/A converter for converting image data read out from image frames 20 and 22 into an analog signal.

In this still image system, signals intercepted by antenna 10 are converted by tuner 16 into digitally compressed data, which is then decoded by decoder 18. Decoded data from decoder 18 is written in alternate image frame memories 20 and 22 under control of switch 24, and data read out from image frame memories 20 and 22 are supplied to D/A converter 28 and printer 13 alternately under control of switch 26. In other words, switches 24 and 26 function such that decoded data is written in one image frame memory (for instance 20) while stored data is read out from the other image frame memory (for instance 22).

As to the transmission rate, since one still image frame is observed in several to several tens of seconds, it is usually about 2 Mbps for saving the transmission bandwidth (here the bit rate of the transmission).

In the still image system, if it is desired to obtain a hard copy of the received image on a recording sheet or the like using printer 13, during transfer of data to printer 13 one of the image frame memories 20 and an 22 is occupied, and image from the other image frame memory can not be observed on monitor 14.

SUMMARY OF THE INVENTION

An object of the present invention is to provide an apparatus which permits recognition of progressively given image signals even while image data is transferred to the outside.

It is another object of the present invention to provide an apparatus which permits real time recognition of a given image signal on the monitor.

To attain the above objects of the invention, there is provided as a preferred embodiment thereof an image reproduction apparatus which comprises at least two frame memory means, control means for inhibiting writing of data in the first frame memory means during transfer of data stored in the first frame memory means to a given unit, and allotting means for pseudo-allotting part of the second frame memory means during transfer of data stored in the first frame memory means to the predetermined unit, and in which during transfer of data stored in the first frame memory means to an external unit such as a printer, part of the second frame memory means is used in lieu of the first frame memory means, and thus the monitor output can be continued as such.

A further object of the invention is to provide an apparatus, which permits confirmation of an image signal to be given even during transfer of image data to the outside by a simple method of control.

The above and other objects and features of the invention will become more apparent from the following description of embodiments thereof with reference to the drawings.

BRIEF DESCRIPTION OF THE DRAWINGS

FIG. 6 is a block diagram showing a third embodiment of the invention.

DETAILED DESCRIPTION OF THE PREFERRED EMBODIMENTS

Now, a first embodiment of the invention will be described with reference to the Drawings.

Figure 1:
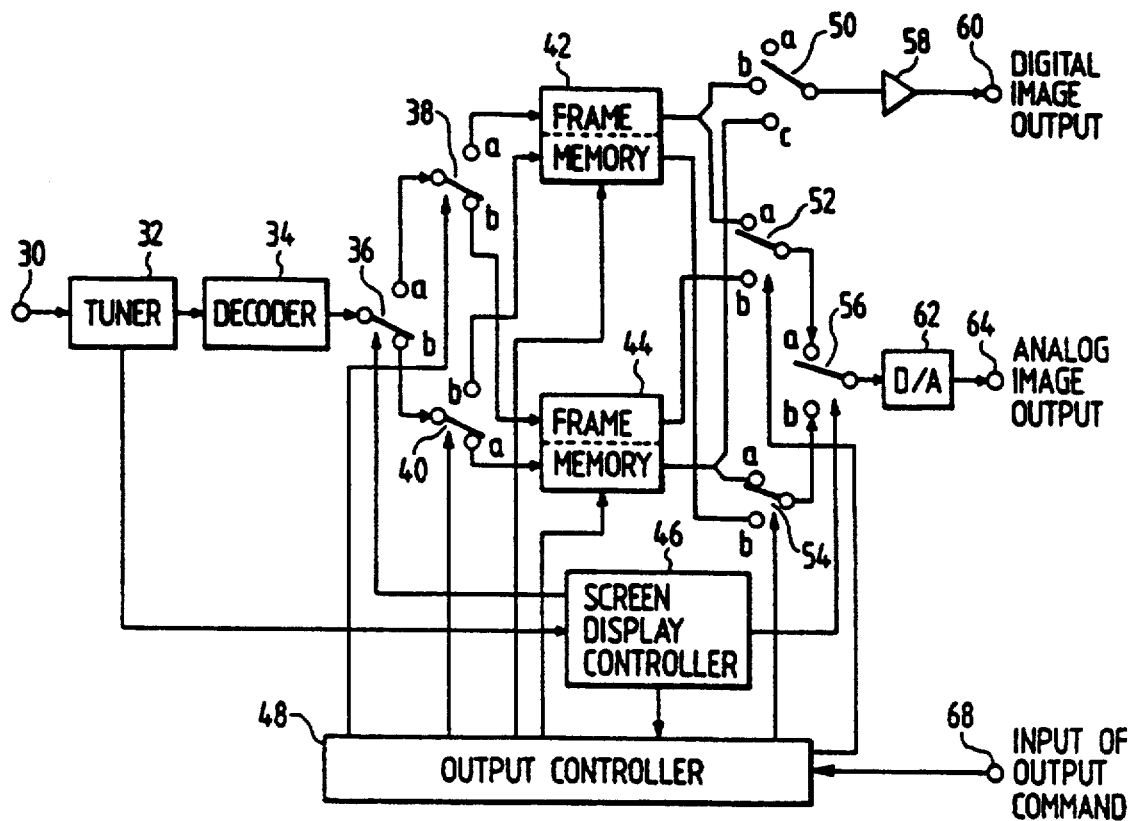
FIG. 1 is a block diagram showing a first embodiment of the invention.

FIG. 1 is a block diagram showing the first embodiment of the invention. To input terminal 30 is supplied a signal of received by an antenna (not shown). Tuner 32 converts the signal from input terminal 30 into still image digital compression data and also generates an image display switching signal to be described later. The still image digital compression data is supplied to decoder 34. Decoder 34 decodes the still image digital compression data, obtained on the transmitting side through bandwidth compression by a DPCM process, for instance, thus providing original image data. Decoded data from decoder 34 is written in one of image frame memories 42 and 44 through switches 36, 38 and 40 as will be described later in detail. Image frame memories 42 and 44 are such that they permit reading of data in one of two memory areas while data is written in the other memory area. In this embodiment, these image frame memories comprise by semi-conductor memories.

Decoded data read out from image frame memories 42 and 44 are selected by switch 50 and provided as a digital output signal from digital output terminal 60 through buffer 58. To output terminal 60 is connected a printer, for instance. In switch 50 a contact a is a pseudo-contact which indicates that switch 50 is switched to the side of either contact b nor contact c. Decoded data read out from image frame memories 42 and 44 is selected by switches 52, 54 and 56 and converted by D/A converter 62 into an analog signal and is provided as an analog image signal from analog output terminal 64. To output terminal 64 is connected a color monitor, for instance.

Screen display controller 46 controls switches 36 and 56 according to image display switching control data from tuner 32. Output controller 48 controls switches 38, 40, 50, 52 and 54 according to an output command given from output command input terminal 68 to select image frame memories 42 and 44 and memory areas thereof for writing and reading decoded data during an output from digital image output terminal 60.

Now, the operation of the system of FIG. 1 will be described. Normally, switches 38, 40, 50, 52 and 54 are connected to their respective "a" contacts, and screen display controller 46 controls switches 36 and 56 according to switching control data from tuner 32. In the illustrated state, decoded data from decoder 34 is written in image frame memory 44, while decoded data read out from image frame memory 42 is converted by D/A converter 62 into analog signal to be provided from output terminal 64. When writing of data in image frame memory 44 is completed, screen display controller 46 switches switch 56 to the side of contact b to let decoded data stored in image frame memory 44 be supplied to D/A converter 62. While stored data in image frame memory 44 is read out, switch 36 is held switched to the side of contact a, and decoded data from decoder 34 is written in image frame memory 42.

Screen display controller 46 controls switches 36 and 56 according to screen display switching control data from tuner 32, i.e., a program from the transmitting side (or broadcast station), in such a manner as to repeat the above switching operation.

When it is intended by the viewer to let an image displayed on the monitor be provided to a printer, that is, to digitally provide image data from image frame memory 42, an output command is impressed on output controller 48 from input terminal 68. When writing of decoded data in image frame memory 44 is completed, screen display controller 46 switches switch 36 to the side of the contact a and switch 56 to the side of the contact b. At the same time, output controller 48 separates image frame memory 42 from the rest for exclusive use for digital output and allots part of a memory area of frame memory 44 as a memory area in lieu of image frame memory 42. More specifically, image frame memory 44 is operated in the same way as where there are two image frame memories 42 and 44.

More specifically, output controller 48 switches the switches 38 and 52 to their contact b sides in response to a timing signal supplied from screen display controller 46 to let decoded data to be intrinsically written in image frame memory 42 be written in a first (one-half) area of image frame memory 44, and to let decoded data to be intrinsically written in image frame memory 44 be written in a second (one half) area of the memory, while causing reading of data from the first one-half area of image frame memory 44 instead of reading of data from image frame memory 42. Since only one half of the intrinsic memory area is provided, decoded data of decoder 34 is thinned out to one half before being written in image frame memories 42 and 44. The thinned-out data thus written is interpolated by two-fold reading before being supplied to D/A converter 62.

Output controller 48 further switches switch 50 to the side of contact b. Thus, image data from image frame memory 42 is provided from digital image output terminal 60 to a printer or the like (not shown). In this state, image frame memory 42 is completely separated from the rest of the system shown with respect to FIG. 1 to be handled freely in timings of external units such as a printer.

When the printer output operation is completed and the output command from the output command input terminal is released, output controller 48 switches switches 36, 38, 50 and 52 to the side contact "a" sides by detecting the timing of writing data in image frame memory 42 under control of a timing signal from screen display controller 46. At this time, however, the image data in the second one-half area of image frame memory 44 is still being read out. Thus, the control of writing and reading data with respect to two memory areas of image frame memory 44 is continued, and the control of writing and reading of data with respect to two memory area divisions of image frame memory 44 is released at an instant when screen display controller 46 switches switch 36 to its contact b and switches switch 56 to its contact "a" after completion of writing of image data in image frame memory 42.

When an output command appears at output command terminal 68 while image data stored in image frame memory 44 is read out, the same operation as described above is executed except that switches 40 and 54 are switched to their contact b sides in lieu of switches 38 and 52.

Figure 2:
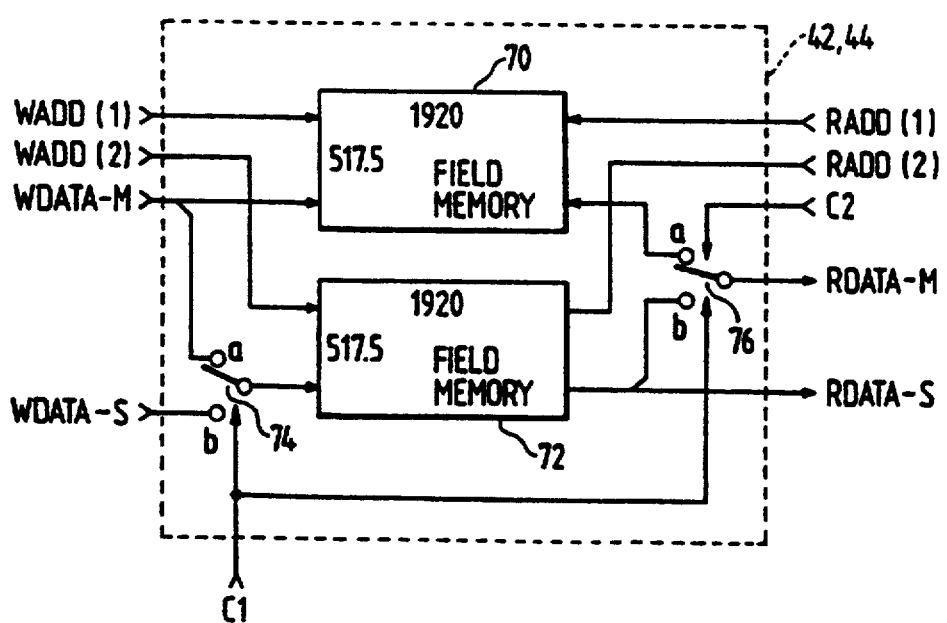
FIG. 2 is a block diagram showing an example of image frame memories 42 and 44 shown in FIG. 1.

FIG. 2 shows the construction of image frame memories 42 and 44. Reference numerals 70 and 72 designate field memories. Where a HDTV signal is supplied to the apparatus, one field is constituted by 1,920 pixels by 517.5 scannnig lines for one frame is constituted by 1,920 pixels by 1,035 scanning lines. Reference numerals 74 and 76 designate switches for switching data. Switch 74 is normally held connected to the side of contact a. Switch 76 is normally controlled by control signal C2 and held switched to contact a during reading of the first field and to contact b during reading of the second field. Normally, field memories 70 and 72 are designated by write addresses WAdd(1) and WAdd(2) for writing data on write data line WData-M. Further, field memories 70 and 72 are designated by respective read addresses RAdd(1) and RAdd(2) for reading out data onto read data line RData-M. Lines WAdd(1), WAdd(2), RAdd(1) and RAdd(2) are controlled by output controller 48.

Now, the operation of image frame memory 44 will be described in connection with a case when it is intended to digitally provide data stored in image frame memory 42 to a printer, for instance. When there is an output command and at an instant of switching of the screen display output from image frame memory 42 over to image frame memory 44, switches 4 and 76 are switched to their contact a and b sides, respectively, according to control signal C1. Thus, the display of the output from image frame memory 44 is an image as a result of repetition of the same field image according to read address RAdd(1). At this time, field memory 72 is separated from field memory 70, and data on write data line WData-S is written in according to write address WAdd(2). To this write data line WData-S is supplied data which is to be intrinsically written in image frame memory 42. In this case, there is only a memory area for one field despite the one frame of still image data which is given.

At an instant when the output command is released, writing of data in image frame memory 42 is completed and switches 36 and 56 are switched to the sides of their contacts b and a, respectively, by screen display controller 46, and switch 47 in FIG. 2 is switched back to contact a. As a result, image frame memory 44 is operated again as a frame memory for one frame.

Figure 3:
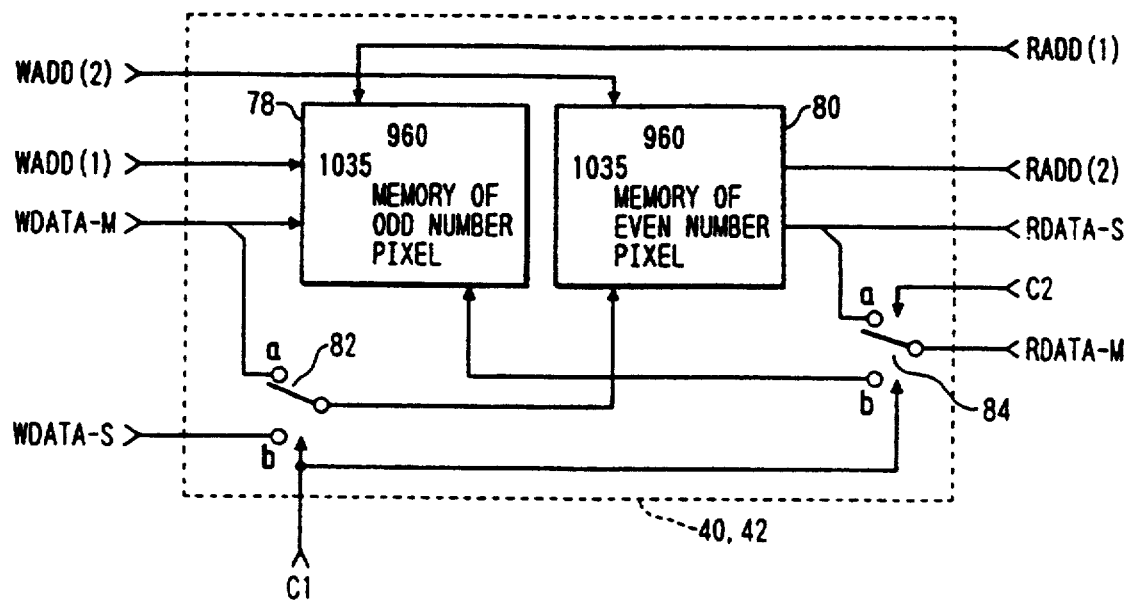
FIG. 3 is a block diagram showing a different example of image frame memories 42 and 44.
Figure 4:
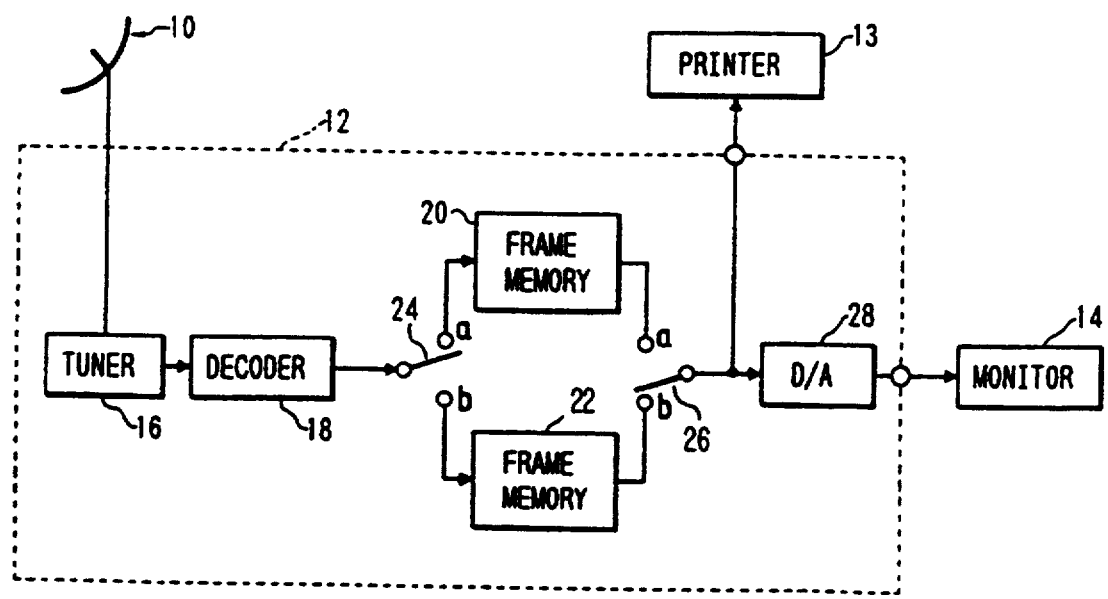
FIG. 4 is a block diagram showing a still image system.

FIG. 3 shows a modification of the construction of image frame memories 42 and 44. Reference numeral 78 designates an odd number pixel memory for storing odd number pixel data along given image data, and 80 is an even pixel memory for storing even number pixel data. In the case of HDTV, memories 78 and 80 both have a memory capacity of 960 pixels by 1,035 scanning lines. Reference numerals 82 and 84 designate switches for switching data lines. Switch 82 is normally held switched to the side of contact a, and switch 84 is normally held switched to contact a according to control signal C2 during reading of even pixel data and held switched to contact b during reading of odd pixel data. Normally, odd and even pixel memories 78 and 80 are designated by write addresses WAdd(1) and WAdd(2), respectively, for writing data from write data line WData-M. Further, odd and even pixel memories 78 and 80 are designated by read addresses RAdd(1) and RAdd(2) for reading out data on data line RData-M.

Now, the operation of image frame memory 44 will be described in connection with a case when it is desired to digitally provide data stored in image frame memory 42 to a printer, for instance, as shown before. When there is an output command and at the instant of switching of screen display output from image frame memory 42 over to image frame memory 44, switches 82 and 84 are switched to the sides of contacts b and a, respectively, according to control signal C1. As a result, the display of the output of image frame memory 44 is an image of a reduced horizontal resolution by specifying read address WAdd(1) twice. At this time, even pixel memory 80 is separated from odd pixel memory 78 and data on write data line WData-S according to write address WAdd(2). To write data line WData-S is supplied data which is to be intrinsically written in image frame memory 42. Since only a memory area for one field is provided for one frame, image data obtained by thinning out data to one half in the horizontal direction is written.

At an instant when the output command is released, the writing of data in image frame memory 42 is completed and switches 36 and 56 are switched to their contacts b and a, respectively, by screen display controller 46, switch 82 in FIG. 3 is and switched back to the side of contact a. Consequently, image frame memory 44 operates again as a frame memory for one frame.

Figure 5:
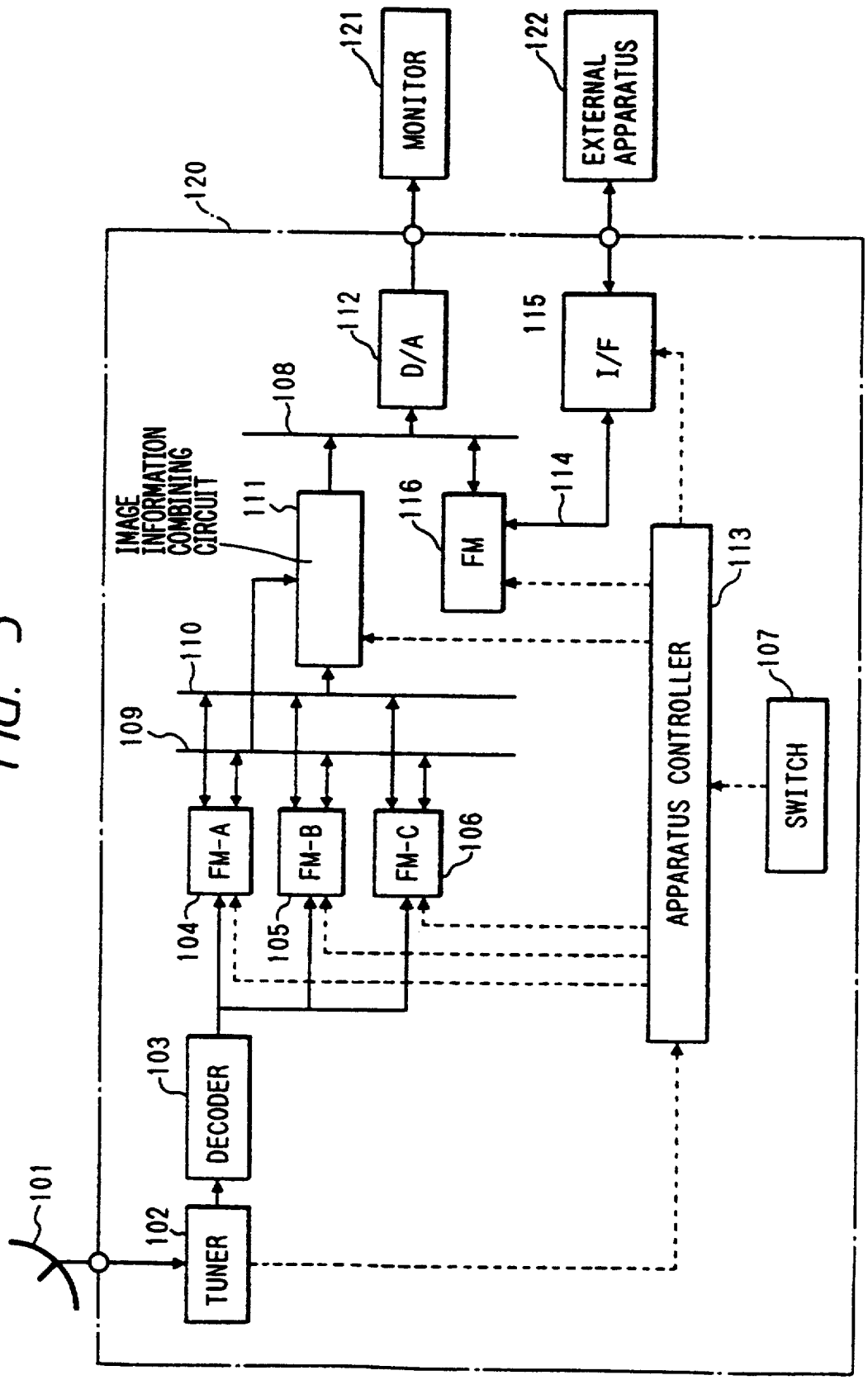
FIG. 5 is a block diagram showing a second embodiment of the invention.

Now, a second embodiment of the invention will be described. FIG. 5 is a block diagram showing the second embodiment of the invention. Reference numeral 101 designates an antenna for receiving given signals, 120 is an image receiving and reproducing apparatus according to the invention, 121 is a HDTV color monitor for displaying images with 1,125 scanning lines, and 122 is an external unit such as a printer or an the like or input unit such as a scanner or the like. In the image receiving and reproducing apparatus 120, reference numeral 102 designates a tuner for separating digitally compressed image data and apparatus control data from signals received by antenna 101, 103 is a decoder for decoding digitally compressed image data, obtained through bandwidth compression by a DPCM process, for instance, into original image data, 104 is an image frame memory FM-A for storing one frame of decoded image data from decoder 103, 105 is an image frame memory FM-B for storing one frame of decoded image data from decoder 103, and 106 is an image frame memory FM-C for storing one frame of decoded image data from decoder 103. These image frame memories are multi-port random access memories capable writing of image data in random addresses from the side of decoder 103, and also capably of entirely asynchronous reading of data at the frame rate, i.e., in a time in which one frame of an image can be effectively transmitted in 1/30 seconds. Reference numeral 107 designates a switch for a viewer's request of freezing an image, for instance, provided to the apparatus, 109 is a digital video bus VB-A for effectively transmitting digital image signal at the frame rate, 110 is another digital video bus VB-B for effectively transmitting digital image signals at the frame rate, 111 is an image information combining circuit for calculating image data using digital video buses VB-A 109 and VB-B 110 for image effect processing, 108 is a digital video bus VB-C for effectively transmitting digital image signals at the frame rate, and 116 is an image frame memory FM for effectively storing one frame of the output of image information combining circuit 111 at the frame rate. This image frame memory FM is capable writing and reading of data entirely asynchronously from the image frame rate through external interface bus 114, i.e., a data line, an address control line, and other control lines. Reference numeral 112 designates a D/A converter for converting image data on digital video bus VB-C into an analog signal, and 113 is an apparatus controller for normally controlling the writing and reading of data in and from frame memories FM-A 104, FM-B 105 and FM-C 106, controlling the output of image information combining circuit 111 and input to and output from image frame memory 116 through digital video bus VB-C 108, and controlling the input to and output from image frame memory 116 through external interface bus 114.

In the case of a usual image, image data written in image frame memories FM-A 104, FM-B 105 and FM-C 106 are generated by decoder 106, and apparatus controller 113 determines a frame memory in which to write a write command received from tuner 102. Further, apparatus controller 113 determines a video bus on which to provide the output of frame memories 109 and 110 while effecting timewise management of a read command received by tuner 102, and also provides various image effect execution commands to image information combining circuit 111.

When the user produces a request for watching a momentary image in a certain given program continuously produced on the monitor using switch 107 shown in FIG. 5, apparatus controller 113 immediately writes the output of image circuit 111 in image frame memory FM 116 through digital video bus VB-C at the frame rate. Simultaneously with the completion of writing of image in one frame time, apparatus controller 113 separates image circuit 111 from digital video bus VB-C 108 and causes output from image frame memory 116. Consequently, a commonly termed freeze function is realized. An image transmitted from the transmitting side during freezing is stored as usual in image frame memories FM-A 104, FM-B 105 and FM-C 106 and does not vanish. However, it is not provided from image circuit 111 and thus it does not appear on monitor 121.

When the viewer makes a freeze release request using switch 107 in FIG. 5, apparatus controller 113 immediately separates image frame memory FM 116 from digital video bus VB-C 108 and causes output from image circuit 111. Thus, a commonly termed freeze function release can be realized. During freezing, the image transmitted from the transmitting side has been stored as usual in image frame memories FM-A 104, FM-B 105 and FM-C 106, and therefore the apparatus operates entirely normally after release of the function.

When the viewer produces, using switch 7 in FIG. 5, a request for printing out a certain momentary image in a program using an external hard copy unit or the like, apparatus controller 113 immediately writes the output of image circuit 111 in image frame memory FM 116 through digital video bus VB-C 108 at the frame rate. Simultaneously with the completion of writing of an image in one frame time, apparatus controller 113 separates image circuit 111 from digital video bus VB-C 108 and causes the contents of image frame memory FM 116 to be output to the external unit, thus permitting the viewer to check whether the image stored in image frame memory FM 116 is a desired image. After completion of the check, the viewer indicates completion of confirmation using switch 7 shown in FIG. 5. Apparatus controller 113 immediately separates image frame memory FM 116 from digital video bus VB-C 108 and outputs the contents of image circuit 111. During the time, prior to completion of confirmation the image supplied from the transmitting side is stored as usual in image frame memories FM-A 104, FM-B 105 and FM-C 106 and does not vanish. However, it is not provided from image circuit 111 and does not appear on monitor 121.

Through these procedures, the image which is desired by the viewer to be printed out is stored in image frame memory FM 116 in FIG. 5. Thereafter, image data can be provided to printer 122 or a like external apparatus through interface I/F 115 and external interface bus 114. Depending on the external apparatus, image data is provided unilaterally from the side of the apparatus. Also, it is possible to effect transfer of image data through random access while effecting a hand shake between the apparatus and the external apparatus.

FIG. 6 shows a third embodiment of the image receiving and reproducing apparatus. This embodiment is the same in construction as the embodiment of FIG. 5. When the viewer intends to let an image input from an external scanner or the like be displayed on monitor 121 using the present apparatus, in response to an image take-in request made by the viewer using switch 7 in FIG. 6, apparatus controller 113 causes image data to be input from external scanner 122 or the like through interface I/F 115 and external interface bus 114. Depending on the external apparatus, image data is provided unilaterally from the external apparatus to be received sequentially on the side of the apparatus. In some cases, image data is received through random access with a hand shake made between the apparatus and the external apparatus. Interface 115 of this embodiment is responsive to of both these apparatuses. When the viewer makes an image display request using switch 7 in FIG. 6 after completion of image data input, apparatus controller 113 immediately separates image effect circuit 111 from digital video bus VB-C 108 and causes output from image frame memory 116. Thus, the viewer can cause an image input using external scanner 122 to be displayed on monitor 121 using the apparatus. When the user produces an image display release request using switch 107 in FIG. 5, apparatus controller 113 immediately separates image frame memory FM 116 from digital video bus VB-C 108 and produces an output from image effect circuit 111.

In this embodiment, frame memory FM 116 used for a printer or like external interface is provided separately from frame memories FM-A, FM-B and FM-C. Thus, even while particular image data is provided to the external apparatus, image display according to a program can be obtained on monitor 21 without interruption.

FIG. 6 shows a modification of the embodiment shown in FIG. 5. In this embodiment, switch 208 for selecting either output of image effect circuit 111 or output of FM 116 is provided in lieu of coupling image effect circuit 111, FM 116 and D/A converter 112 to one another with a bus. Further, the output of image effect circuit 111 is connected to FM 116 via a separate line.

In this embodiment, when a request for freezing an image displayed on monitor 21 is sent by the user, the image signal is read out from frame memory FM 116 after completion of writing the image signal in frame memory FM 116 according to such setting.

With the construction shown in FIG. 6, an image signal output to monitor 21 can be switched at high speed with switching of switch 208.

While the above embodiments concern the reproducing processing of image data transmitted via broadcast signals, the invention is of course applicable as well to apparatuses for reproducing images recorded on optical disks, opto-magnetic disks, magnetic tapes and other recording media.

As will be readily understood from the above description, in this embodiment it is possible to provide monitor output during output of data to a printer or a like external apparatus.

I claim:

1. A reproducing apparatus comprising:
   (a) first storage means for storing a plurality of image signals supplied sequentially at a first rate, each of the stored image signals representing a different image;
   (b) first means for reading out image signals stored in said first storage means and supplying the read out image signals sequentially to an output terminal at a second rate which is different from the first rate; and
   (c) second means, comprising a second storage means for storing at least one image signal, for outputting one image signal from among the plurality of stored image signals by transferring the one image signal to said second storage means and outputting the one image signal from said second storage means while image signals are being supplied sequentially from said first means to said output terminal, said first storage means and said second storage means being coupled in parallel.

2. The reproducing apparatus according to claim 1, which further comprises:
   (d) a monitor coupled to said output terminal.

3. The reproducing apparatus according to claim 1, which further comprises:
   a printer coupled to said second means.

4. The reproducing apparatus according to claim 1, wherein said second means includes;
   means for reading out the one image signal from said second storage means and outputting said one image signal.

5. The reproducing apparatus according to claim 1, wherein said second means includes;
   means for coupling only a portion of said first storage means to said second means in order to output said one image signal.

6. The reproducing apparatus according to claim 5, wherein said first storage means comprises a frame memory including two field memories.

7. The reproducing apparatus according to claim 6, wherein said portion of said first storage means comprises one field memory.

8. A reproducing apparatus comprising:
   (a) generating means for sequentially generating image signals representing different images;
   (b) storage means for sequentially storing image signals generated by said generating means at a first rate for subsequent display on a monitor at a second rate which is different from the first rate, said storage means comprising double buffer memories; and
   (c) supplying means, provided separately from said storage means, for storing at least one image signal generated by said generating means, and for outputting to an external apparatus an image signal which is different than the image signals output to the monitor while the monitor is displaying the image signals, said supplying means and said double buffer memories being coupled in parallel.

9. The reproducing apparatus according to claim 8, wherein said generating means includes a receiving unit for receiving image signals from an external device.

10. The reproducing apparatus according to claim 8, wherein said storage means includes a frame memory.

11. The reproducing apparatus according to claim 8, wherein said supplying means includes;
   memory means provided separately from said storage means and comprising a frame memory having a capacity corresponding to one frame.

12. The reproducing apparatus according to claim 8, wherein the external apparatus comprises a printer.

13. A reproducing apparatus comprising:
   (a) first storage means for storing a plurality of image signals supplied sequentially, each of the stored image signals representing a different image;
   (b) first means for reading out image signals stored in said first storage means and supplying the read-out image signals sequentially to a first external device;
   (c) second storage means for storing at least one image signal read out from said first storage means, said first storage means and said second storage means being coupled in parallel; and
   (d) second means for outputting one image signal from among the plurality of stored image signals by transferring the one image signal to said second storage means and outputting the one image signal from said second storage means to a second external device while image signals are being supplied sequentially from said first means to the first external device, a rate at which the image signals are supplied from said first storage means to the first external device being different from a rate at which the one image signal is supplied from said second storage means to the second external device.

14. An apparatus according to claim 13, wherein the first external device comprises a monitor and the second external device comprises a printer.

15. A reproducing apparatus comprising:
   (a) generating means for sequentially generating image signals representing different images;

(b) storage means for sequentially storing image signals generated by said generating means, and for sequentially outputting the image signals to a first external device, said storage means including double buffer memories; and (c) supplying means, provided separately from said storage means, for storing at least one image signal generated by said generating means, and for outputting to a second external device an image signal which is different than the image signals output to the first external device, a rate at which said storage means outputs the image signal to the first external device being different from a rate at which said supplying means outputs the image signal to the second external device, and said supplying means and said storage means being coupled in parallel.

16. An apparatus according to claim 15, wherein the first external device comprises a monitor and the second external device comprises a printer.

17. A reproducing apparatus comprising:

(a) generating means for sequentially generating image signals representing different images;

(b) storage means for sequentially storing image signals generated by said generating means, said storage means comprising first and second memory elements each of which is capable of storing one frame of image signals, the first memory element comprising first and second portions each of which is capable of storing a half of one frame of image signals; and (c) mode changing means for changing a mode of the apparatus among a plurality of modes including a mode in which image signals stored in the first and second memory elements are alternately output to a first external device and a mode in which image signals stored in the first and second portions of the first memory element are alternately output to the first external device and an image signal stored in the second memory element is output to a second external device.

18. An apparatus according to claim 17, wherein the first external device comprises a monitor and the second external device comprises a printer.

19. An apparatus according to claim 17, wherein a rate at which the image signal is output to the first external device is faster than a rate at which the image signal is output to the second external device.

20. An apparatus according to claim 17, wherein the frame of the image signals comprises two fields of the image signals, and each of the first and second portions is able to store one field of the image signals.

21. An apparatus according to claim 17, wherein said first portion stores odd number pixels of the image signal and said second portion stores even number pixels of the image signal.

22. An image storing device having an output terminal, comprising:

(a) first and second memories each of which is capable of storing one frame of image signals, each of said memories comprising two portions each of which is capable of storing a half of one frame of an image signal;

(b) input means for inputting a sequential image signal to said first and second memories, alternately;

(c) first output means for outputting the sequential image signal from said first and second memories to the output terminal, said first output means (i) selectively performing first and second signal processing operations, (ii) alternately outputting to the output terminal the sequential image signal stored in the first and second memories by the first signal processing operation, and (iii) alternately outputting to the output terminal the portion of the sequential image signal stored in the two portions of one of said first and second memories by the second signal processing operation; and (d) second output means for outputting the portion of the sequential image signal stored in the other memory than the memory from which the image signal is output to the output terminal by the second signal processing operation of the first output means.

* * * * *

UNITED STATES PATENT AND TRADEMARK OFFICE
CERTIFICATE OF CORRECTION

PATENT NO. : 5,369,441  Page 1 of 2
DATED : November 29, 1994
INVENTOR(S) : Masahiko ENARI It is certified that error appears in the above-indentified patent and that said Letters Patent is hereby corrected as shown below:

COVERPAGE

Item [57] ABSTRACT, Line 9, "storing" should read --storing and--.

COLUMN 1

Line 6, "This" should read --This application--.

COLUMN 2

Line 51, "an" should be deleted.
Line 52, "and" should read --and an--.

COLUMN 3

Line 39, "of" should be deleted.

COLUMN 4

Line 55, "causing" should read --allowing--.

COLUMN 5

Line 6, "the side" should read --their--.
Line 30, "scanning lines for" should read --scanning lines, and--.
Line 51, "switches 4" should read --switches 74--.

UNITED STATES PATENT AND TRADEMARK OFFICE
CERTIFICATE OF CORRECTION

PATENT NO. : 5,369,441 Page 2 of 2

DATED : November 29, 1994

INVENTOR(S) : Masahiko ENARI

It is certified that error appears in the above-indentified patent and that said Letters Patent is hereby corrected as shown below:

COLUMN 6

Line 56, "or an" should read --or--.
    Line 57, "input" should read --an input--.

COLUMN 7

Line 5, "capably" should read --capable--.
    Line 12, "signal" should read --signals--.
    Line 22, "capable" should read --capable of--.
    Line 23, "of" should be deleted.

COLUMN 8

Line 24, "time," should read --time-- and
          "confirmation" should read --confirmation,--
    Line 56, "of" should be deleted.

Signed and Sealed this

Sixteenth Day of May, 1995

Attest:

BRUCE LEHMAN

Attesting Officer      Commissioner of Patents and Trademarks